United States Patent
Seltzer et al.

(10) Patent No.: US 7,983,913 B2
(45) Date of Patent: Jul. 19, 2011

(54) UNDERSTANDING SPOKEN LOCATION INFORMATION BASED ON INTERSECTIONS

(75) Inventors: Michael L. Seltzer, Seattle, WA (US); Yun-Cheng Ju, Bellevue, WA (US); Ivan J. Tashev, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1022 days.

(21) Appl. No.: 11/888,275

(22) Filed: Jul. 31, 2007

(65) Prior Publication Data

US 2009/0037174 A1    Feb. 5, 2009

(51) Int. Cl.
    *G10L 15/04*    (2006.01)
(52) U.S. Cl. .......... 704/251; 704/5; 704/246; 704/247; 704/252
(58) Field of Classification Search .................. None
    See application file for complete search history.

(56) References Cited

U.S. PATENT DOCUMENTS

| | | | |
|---|---|---|---|
| 5,177,685 A * | 1/1993 | Davis et al. ............... 455/456.5 |
| 6,067,521 A | 5/2000 | Ishii et al. ..................... 704/275 |
| 6,112,174 A | 8/2000 | Wakisaka et al. ............ 704/251 |
| 6,434,524 B1 | 8/2002 | Weber ........................... 704/257 |
| 6,598,018 B1 * | 7/2003 | Junqua .......................... 704/251 |
| 6,778,963 B2 | 8/2004 | Yamamoto et al. ........... 704/275 |
| 6,853,907 B2 | 2/2005 | Peterson et al. ............... 701/207 |
| 7,027,975 B1 * | 4/2006 | Pazandak et al. ................. 704/9 |
| 7,623,648 B1 * | 11/2009 | Oppenheim et al. ...... 379/218.01 |
| 2002/0048350 A1 * | 4/2002 | Phillips et al. ............. 379/88.01 |
| 2004/0260543 A1 * | 12/2004 | Horowitz et al. ............. 704/221 |
| 2005/0182558 A1 | 8/2005 | Maruta ......................... 701/200 |
| 2006/0129591 A1 | 6/2006 | Ramsey et al. ................ 707/102 |
| 2006/0129637 A1 | 6/2006 | Yoshida ........................ 709/203 |

OTHER PUBLICATIONS

MapQuest adds Speech Recognition to Location Finder http://www.contactcenterworld.com/view/contact-center-news/MapQuest-adds-Speech-Recognition-to-location-Finder.asp.
Voice Recognition http://ford.com/en/innovation/technology/drivingImrpovment/voiceRecognition.htm.
HellowYellow Launches Voice Business Directory in Greater Toronto http://www.callgenie.com/en/news/news_20050722.html.

* cited by examiner

*Primary Examiner* — Leonard Saint Cyr
(74) *Attorney, Agent, or Firm* — Joseph R. Kelly; Westman, Champlin & Kelly, P.A.

(57) ABSTRACT

In one embodiment, the present system recognizes a user's speech input using an automatically generated probabilistic context free grammar for street names that maps all pronunciation variations of a street name to a single canonical representation during recognition. A tokenizer expands the representation using position-dependent phonetic tokens and an intersection classifier classifies an intersection, despite the presence of recognition errors and incomplete street names.

18 Claims, 7 Drawing Sheets

UNDERSTANDING SPOKEN LOCATION INFORMATION BASED ON INTERSECTIONS

BACKGROUND

There are currently a wide variety of different types of geographic data and graphic software available. For instance, many people have access to digital maps, and mapping software, that facilitates the creation and use of digital maps.

The availability of such digital maps and mapping software has given rise to an industry devoted to location-based software and services. Such software and services provide functionality based on a specified geographic location. For instance, some examples of location-based software and services include route planning software, navigation software, and services that locate nearby businesses, such as restaurants, gas stations, etc.

Some location-based software and services, although they have conventionally been deployed on desktop computers, are being deployed on mobile devices and embedded computers (such as those found in automobiles). In these applications, it can be very important to provide the user with a way for easily inputting locations to the system.

Mobile devices and embedded computers often have very small screens and are used in environments in which it may be undesirable to have the user pay particularly close attention to the mobile device or embedded computer. For instance, some such computers are used while driving. Driving, of course, is a hands-busy/eyes-busy environment, and it would be undesirable to require a user to use certain input modes on a computer (such as typing, mouse inputs, or stylus inputs) while driving.

Other types of input modes, however, are relatively safe. Speech, for instance, is a safe and natural input mode that can be used for inputting location information into such location-based software and services.

There are some difficulties, however, in specifying a location using speech. Locations can be conveyed by the user in several ways. For example, a business or point of interest can be used to indicate a location if the corresponding address is known. However, this only works for unique businesses or points of interest, and does not work for chain businesses or residences. For example, asking for directions to "ACME Coffee Company" may be highly ambiguous, especially if AMCE Coffee Company is a chain establishment, having many stores. There may be many ACME Coffee Company stores in a given city, and often more than one on a single street.

Specifying a full street address on the other hand, nearly always corresponds to a unique location. Unfortunately, however, using the street address is difficult in practice because of recognition errors, especially when using a speech recognizer that only performs a single recognition pass. For example, when one considers that the state-of-the-art recognition accuracy for a five-digit number in noisy conditions (often found in driving) is approximately 90 percent, this means that one out of ten house numbers or zip codes will be misrecognized. In such cases, the disambiguation strategies used to correct these errors must often resort to tedious digit-by-digit confirmation.

The discussion above is merely provided for general background information and is not intended to be used as an aid in determining the scope of the claimed subject matter.

SUMMARY

A user can specify an intersection as a way to convey an exact location to a spoken dialog system. Intersections have many advantages over conventional methods of location entry. They are quite natural and often used to convey location in human-to-human communication. In addition, it may be easier for a user to determine the nearest intersection than to determine the nearest valid street address, while driving. Similarly, because an intersection has two streets, there are a limited number of ways an intersection can be misrecognized. Either one of the two streets is misrecognized, or both are misrecognized. This makes disambiguation potentially much simpler compared to a street address. Further, if intersections can be recognized reliably, users can uniquely identify an otherwise ambiguous point of interest with a reference intersection, such as "ACME Coffee Company on the corner of Pine Street and Third."

Of course, recognizing intersections reliably is a challenging problem in itself. In major cities, there can be thousands of street names and many more intersections. For example, in the city of Seattle, there are over 3500 unique street names and over twenty thousand intersections. In addition, streets and intersections are often spoken informally with incomplete specifications using a variety of different pronunciations.

In one embodiment, the present system recognizes a user's speech input using an automatically generated, probabilistic, context free grammar for street names that maps all pronunciation variations of a street name to a single canonical representation during recognition. A tokenizer expands the representation using position-dependent phonetic tokens and an intersection classifier classifies an intersection, despite the presence of recognition errors and incomplete street names.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
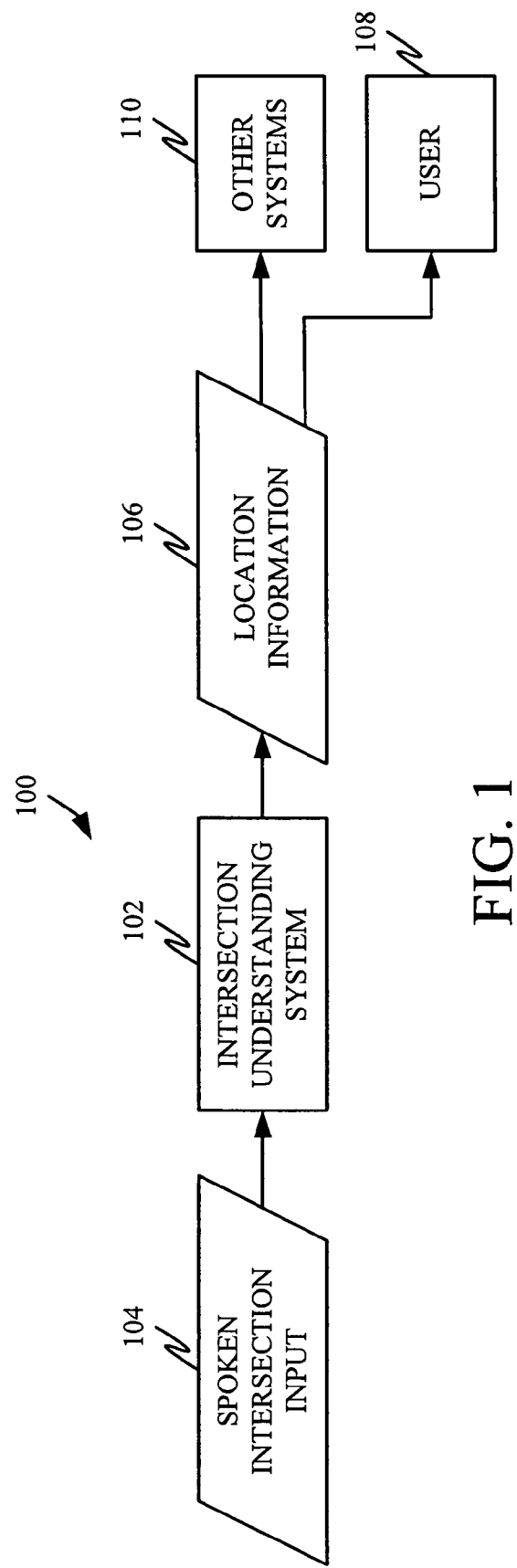
FIG. 1 is a block diagram of one illustrative intersection understanding system.

FIG. 1 is a block diagram of an overall system 100 that can be used for automatically understanding location information input by a user in the form of an intersection. System 100 includes intersection understanding system 102. System 102 is described in greater detail below. System 102 illustratively receives a spoken intersection input 104 from a user. Of course, a textual input could be received as well, but the present description will proceed with respect to a spoken input, for the sake of example. In other words, the user speaks words identifying an intersection into system 102. Based on the spoken intersection input 104, system 102 identifies a location specified by the user and outputs location information 106 indicative of that location. This can be returned to the user 108 or it can be output to one or more other systems 110 for further processing.

There is a high degree of variability in the way people refer to street names. For example, users may use a partial street name, either out of familiarity or convenience. One example of this is "the gas station on 148$^{th}$." Of course, the term "148$^{th}$" does not fully specify a street name but is only a partial street name. Similarly, a user may not know or remember the complete street name or the order of the terms in the street name. Examples of this include "5$^{th}$ Avenue South" and "South 5$^{th}$ Avenue", "5$^{th}$ Avenue" and even "5$^{th}$".

Intersection understanding system 102 illustratively includes an automatic speech recognition system. In order to recognize the different variations in street name pronunciations robustly, a rich, probabilistic, context free grammar that captures the variety of ways people refer to streets is first automatically generated.

Figure 2:
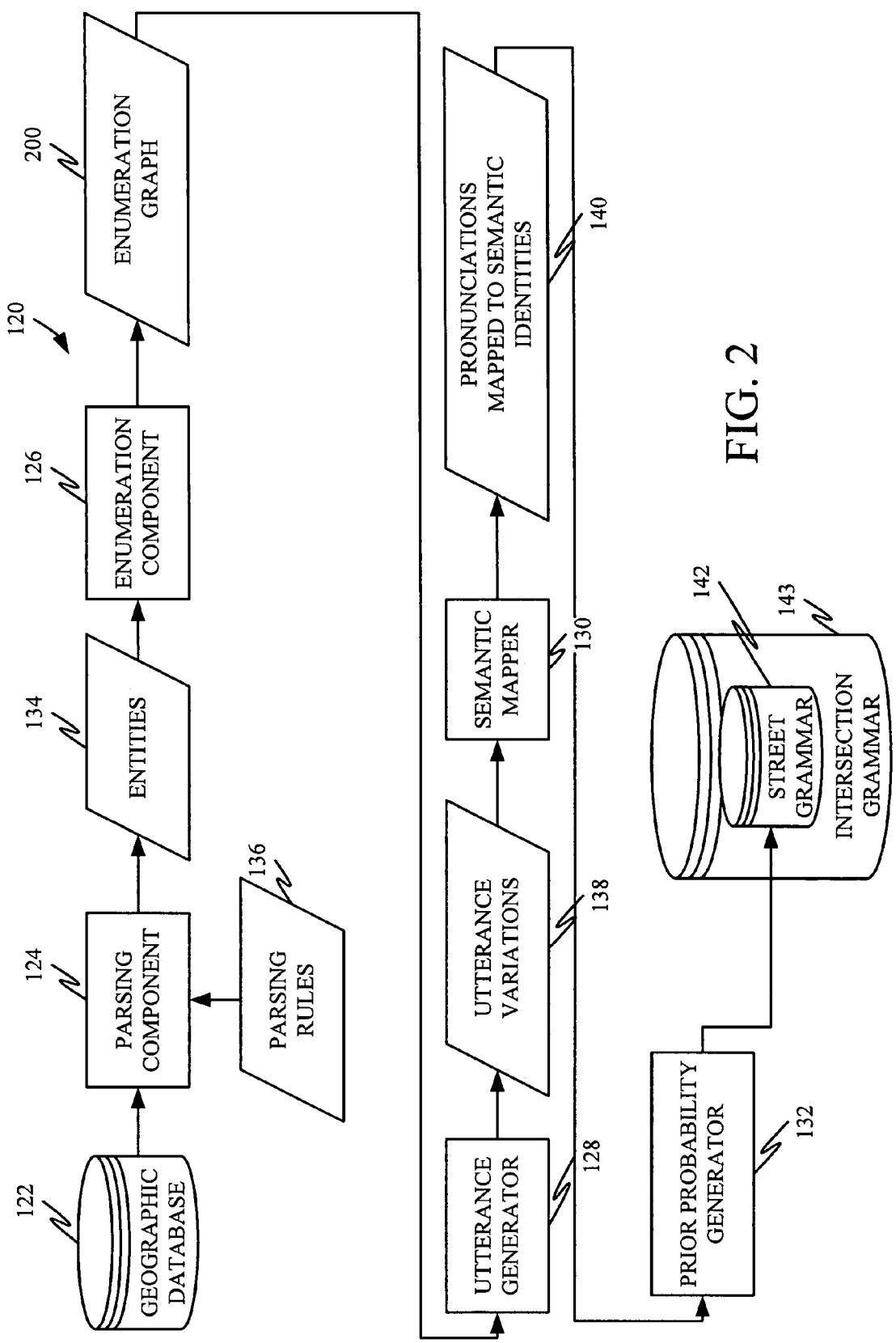
FIG. 2 is a block diagram of a street grammar generator for automatically generating a street grammar used in the system shown in FIG. 1.
Figure 3:
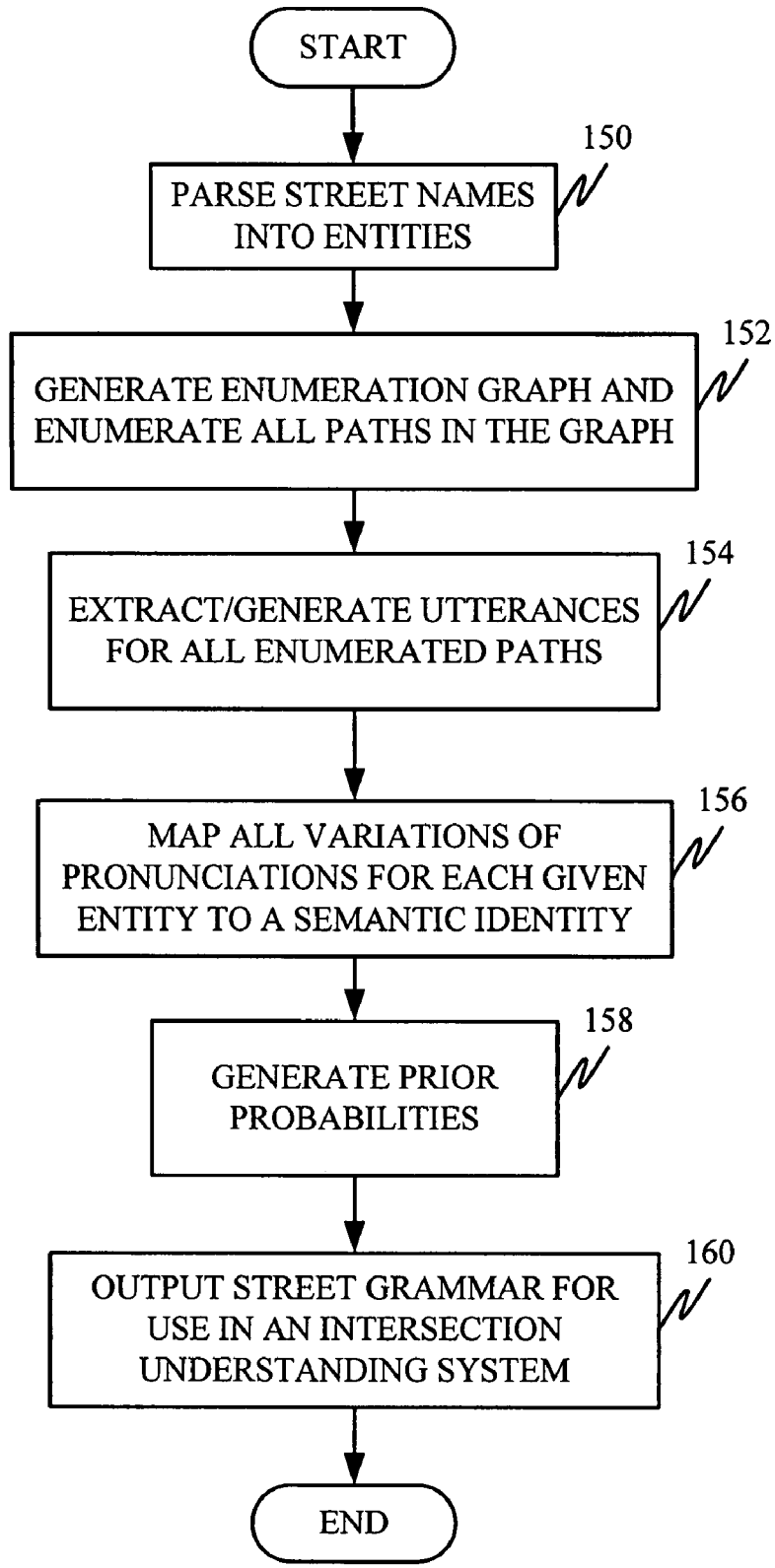
FIG. 3 is a flow diagram illustrating one embodiment of the operation of the system shown in FIG. 2.

FIG. 2 is a block diagram of one illustrative embodiment of a street grammar generation system 120 in accordance with one embodiment. System 120 accesses a geographic database 122 and includes parsing component 124, enumeration component 126, utterance generator 128, semantic mapper 130 and probability generator 132. One embodiment of the operation of system 120 is shown in the flow diagram illustrated in FIG. 3. FIGS. 2-3 will now be described in conjunction with one another.

Geographic database 122 is illustratively a database that contains all street names and intersections in a given city. The street names follow conventional address abbreviations, such as standard street suffix (e.g., St., Ave, Ln.) and compass directions (e.g., N, S, NE, SW). Parsing component 124 extracts the individual street names and intersections from database 122 and parses each into a sequence of entities using regular expressions based on a set of rules. In one illustrative example, the set of rules are hand written rules used to perform the parsing. The parsing rules accessed by parsing component 124 are also illustrated at 136 in FIG. 2.

Table 1 shows a list of entities and a list of what examples for those entities might be. For instance, the entity "InterstatePrefix" may be "I" or "US". Similarly, the entity "HighwayPrefix" may be "Hwy", "SR", "Route", etc. Parsing the street names into these entities is illustrated by block 150 in FIG. 3. The entities are shown at 134 in FIG. 2.

TABLE 1

| Street Entity | Examples |
| --- | --- |
| <InterstatePrefix> | I, US |
| <HighwayPrefix> | Hwy, SR, Route |
| <CardinalAlpha> | 9A |
| <AlphaCardinal> | A101 |
| <Cardinal> | 101, 5, 90 |
| <Ordinal> | 148$^{th}$, 3$^{rd}$ |
| <Direction> | N, S, NE, SW |
| <StreetType> | Ave, Ln, St, Ct |
| <TextName> | Main, Ashbury |

Figure 2A:
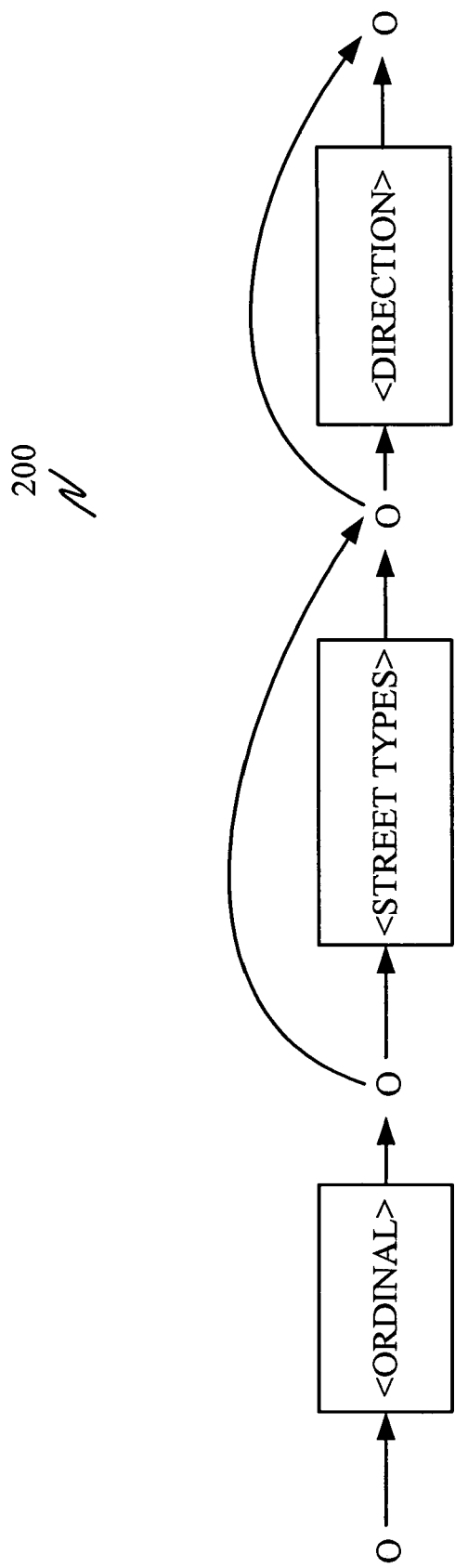
FIG. 2A shows one graphical representation of a street name.

Once parsing component 124 has labeled each of the street names 134 with the entities, enumeration component 126 enumerates all possible variations of the full street name, in one embodiment using a graph-based representation. FIG. 2A shows one embodiment of a graph representation 200 for the term "148$^{th}$ Ave NE". The graph 200 is constructed such that all paths in the graph constitute a valid pronunciation of the street name. A valid street name may, for example, be required to include a cardinal, ordinal, alpha cardinal, cardinal alpha, or text name, while all other labels such as direction, street suffix, and highway prefix can be skipped. Using enumeration component 126 to generate the enumeration graph and enumerate all paths in the graph is indicated by block 152 in FIG. 3.

Once all of the graphs are enumerated, the utterance corresponding to each path through each graph is extracted, text normalized and added to the grammar. For each valid path, additional utterances are also illustratively generated by utterance generator 128. The additional utterances correspond to alternate pronunciations and common prefix substitutions for the given path. This frequently occurs for ordinal street names. For instance, "140$^{th}$" can be pronounced "one hundred and fortieth", "one fortieth", "a hundred fortieth", etc. This also happens for highways, where a variety of prefixes such as "I", "Interstate", or "Highway" are common. An example of the various pronunciations generated for the path "148$^{th}$ Ave NE" shown in FIG. 2A is illustrated in the right hand side of Table 2. The various utterances for each entity in the path, generated by utterance generator 128, are illustrated by 138 in FIG. 2, and extracting them is illustrated by block 154 in FIG. 3.

TABLE 2

| Semantic ID | Recognized Text |
| --- | --- |
| 148$^{th}$ Ave NE | one hundred and forty eighth avenue north east |
| | one hundred forty eighth avenue north east |
| | one forty eighth avenue north east |
| | a hundred and forty eighth avenue north east |
| | a hundred forty eighth avenue north east |
| 148$^{th}$ Ave | one hundred and forty eighth avenue |
| | one hundred forty eighth avenue |
| | one forty eighth avenue |
| | a hundred and forty eighth avenue |
| | a hundred forty eighth avenue |
| 148$^{th}$ NE | one hundred and forty eighth north east |
| | one hundred forty eighth north east |
| | one forty eighth north east |
| | a hundred and forty eighth north east |
| | a hundred forty eighth north east |
| 148$^{th}$ | one hundred and forty eighth |
| | one hundred forty eighth |
| | one forty eighth |
| | a hundred and forty eighth |
| | a hundred forty eighth |

Once all the utterance variations are generated, semantic mapper 130 maps each variation that correspond to a given path taken through the word graph to a common semantic identity. This is indicated by block 156 in FIG. 3. In one embodiment, the semantic identity is used as a semantic tag in a W3C standardized SRGS grammar. This is a known speech recognition grammar specification that is widely recognized. Of course, other standards could be employed as well. By mapping the various pronunciations to a semantic identity (or semantic tag) the recognition can be performed using a probabilistic context free grammar. This has advantages in that a large variety of possible street name pronunciations are collapsed down to a precise canonical representation.

The semantic identity for each of the various pronunciations shown in Table 2 are illustrated on the left column of Table 2. The pronunciations mapped to the semantic identities are represented by 140 in FIG. 2.

Because the grammar is quite large, adding prior probabilities to the entries in the grammar can significantly improve recognition accuracy over a simple uniform distribution.

Therefore, prior probability generator 132 illustratively sets prior probabilities for streets based on the number of intersections of which the given street is a member. Therefore, long, busy streets will have many intersections, while smaller neighborhood streets will have significantly fewer. In order to assign the prior probabilities, once the grammar is generated, duplicate entries are counted and aggregated and their weights are combined. For example, both "148$^{th}$ Ave NE" and "NE 148$^{th}$ PL" will generate entries in the grammar as "148$^{th}$" so this entries weight is proportional to the sum of the weights of all streets with the root ordinal "148$^{th}$". This increases the prior probability of a root ordinal which is shared across several street names. The result of this processing is the probabilistic context free street grammar 142 shown in FIG. 2. Generating the prior probabilities is indicated by block 158 in FIG. 3, and outputting the street grammar 142 for use in intersection understanding is indicated by block 160 in FIG. 3.

In order to recognize naturally spoken intersections, grammar 142 is embedded in another context free grammar 143 that captures typical ways of specifying an intersection, such as "I am on the corner of <Street> and <Street>". This intersection CFG is then combined with a domain-independent N-gram filler model to generate a hybrid CFG/N-gram grammar which is much more robust than a stand alone CFG, to variations in the grammar. In other words, the intersection CFG 143 models various ways of specifying an intersection, but leaves the street names as slots to be filled. The probabilistic street name CFG 142 is used to fill the street slots.

Also, in this way, the intersection grammar can be common to all cities or locations, and the appropriate street grammar can simply be loaded, as desired by the user.

Figure 4:
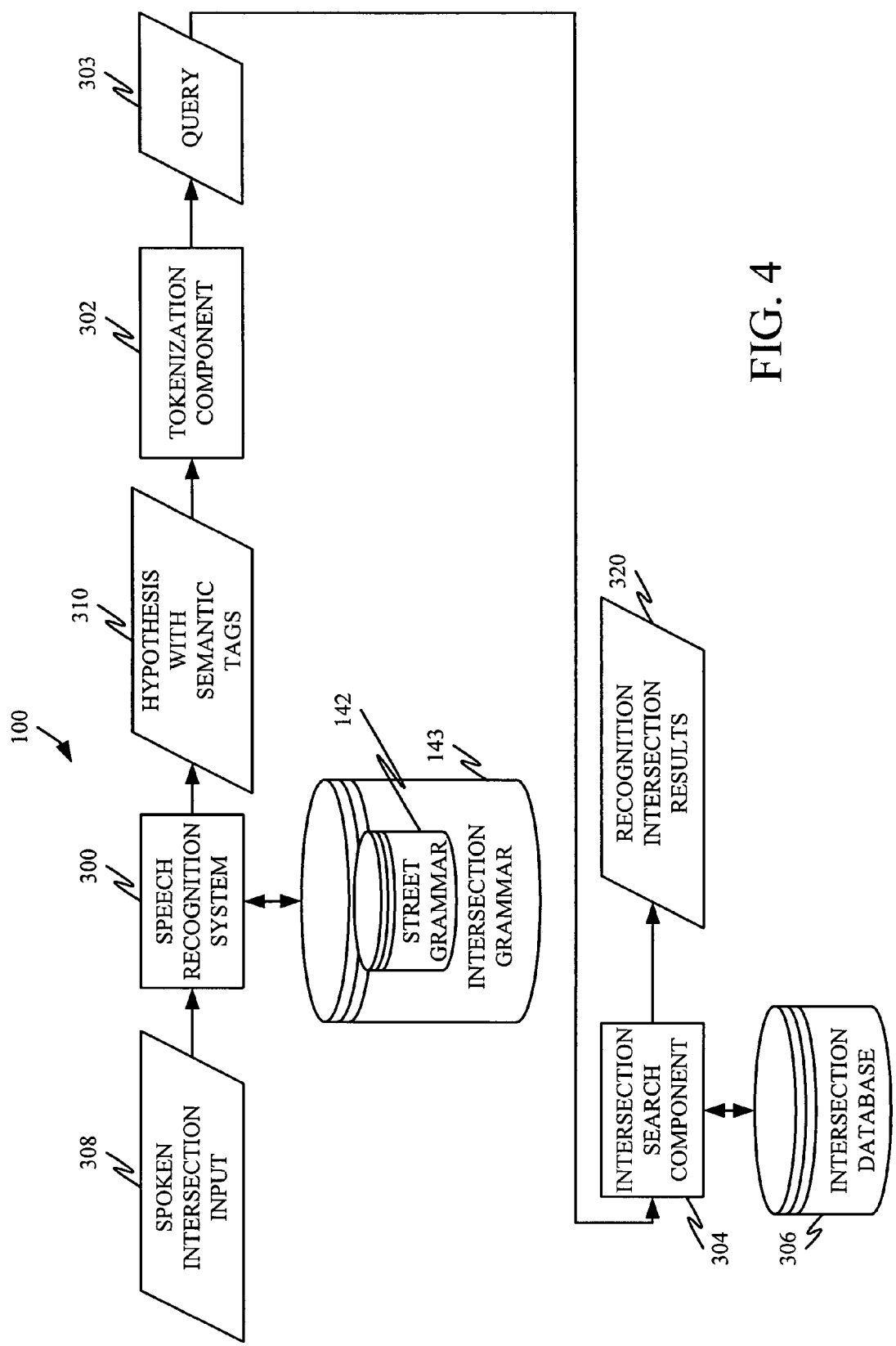
FIG. 4 is a block diagram of a runtime location understanding system in accordance with one embodiment.
Figure 5:
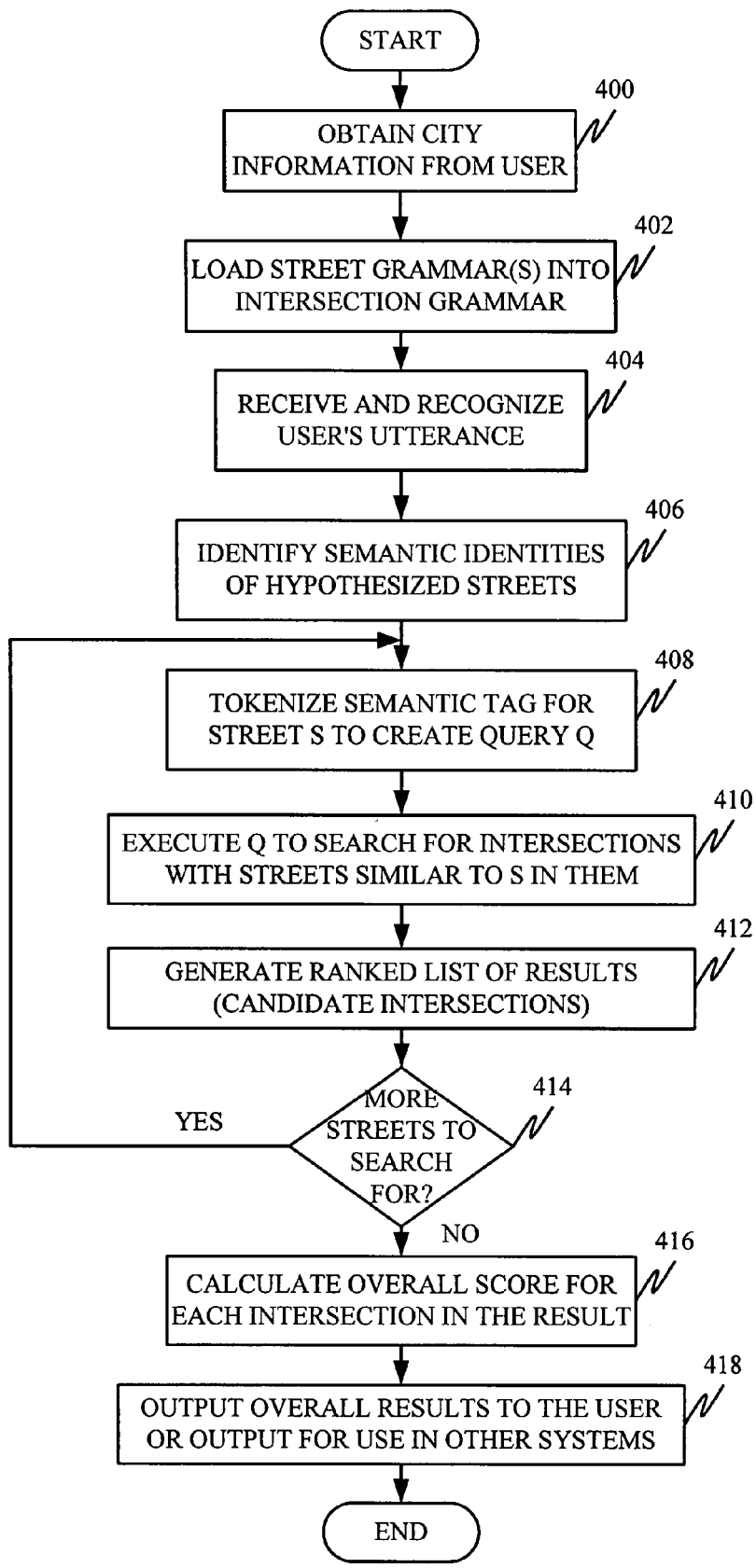
FIG. 5 is a flow diagram illustrating one embodiment of the overall operation of the system shown in FIG. 4.

FIG. 4 shows a runtime system for recognizing location information, based on intersections. System 100 is similar to that shown in FIG. 1, except that it is shown in greater detail. FIG. 4 shows that system 100 includes a speech recognition system 300 that accesses intersection grammar 143 with embedded street grammar 142. System 100 also includes tokenization component 302 and intersection search component (or classifier) 304 that has access to an intersection database 306. FIG. 5 is a flow diagram illustrating one embodiment of the operation of system 100 shown in FIG. 4, in greater detail.

In one embodiment, system 100 is deployed in a dialog system in which a dialog is conducted with the user. Therefore, prior to recognizing the location information, the dialog system first obtains city information from the user. The city information indicates a city of interest to the user. Obtaining the city information from the user is indicated by block 400 in FIG. 5.

Next, the speech recognition system 300 (or the dialog system) loads the street grammar (determined based on the city information received from the user) into the intersection grammar 143. This is indicated by block 402 in FIG. 5. It will be noted, of course, that a user may not know the exact boundary of a given city. Therefore, in one embodiment, a plurality of different street grammars, corresponding to the city denoted by the user, and other cities in close proximity to the denoted city, are also loaded into intersection grammar 143. For instance, in one embodiment, street grammars for all cities bordering the city specified by the user are located into intersection grammar 143. This is described in greater detail below.

In any case, once the appropriate street grammars 142 are loaded into intersection grammar 143, system 100 is ready to recognize a spoken intersection input 308 input by the user. Speech recognition system 300 is illustratively an automatic speech recognition system that receives and recognizes the user's input, or utterance, 308. This is indicated by block 404 in FIG. 5. Speech recognition system 300 uses the appropriate intersection grammar 143 with embedded street grammar 142 to recognize and parse the utterance to obtain a recognition hypothesis (and a corresponding semantic tag for that hypothesis) for each of the streets in the intersection. The recognition hypothesis with the semantic tags is indicated by block 310 in FIG. 4, and identifying the semantic identities (or tags) of the hypothesized streets is indicated by block 406 in FIG. 5.

However, it has been seen that there is a relatively high likelihood that the user uttered only a fragment of the complete street name. In addition, because of the high acoustic confusability among many street names, especially numeric streets, there is a relatively good chance that recognition errors may occur.

In one embodiment, in order to enable system 100 to recover from some misrecognitions, tokenization component 302 is used. Tokenization component 302 tokenizes numeric street names because it has been empirically observed that these are often the streets with the highest acoustic confusability.

Intersection database 306 contains a database of all the intersections, which are searched based on the tokenized recognition result from speech recognition system 300. Searching database 306 is described in greater detail below. However, for purposes of discussion of tokenization component 302, database 306, itself, is not discussed. Each numeric street name in database 306 is illustratively represented by a sequence of phonemes based on a standard speech recognition dictionary. In addition, each phoneme in the sequence is labeled with the digits position of its parent digit, where "100" marks the 100's place, "10" marks the 10's place, and "1" marks the 1's place. The phonemes of ordinal suffixes (st, rd, and th, etc.) are labeled with "0". For example, the "1" in "100" is represented as follows: "$w_{100}ah_{100}n_{100}$", while "8$^{th}$" is transformed into "$ey_1 t_1 th_0$".

There are several advantages to this type of tokenization scheme. It enables the hypothesized numeric strings to be decomposed into a series of elements such that recognition errors remain local to the incorrect subword units. Also, by augmenting the phonemes with the position of the corresponding digit, sequence information is preserved, which allows downstream classification to separate digits which are acoustically identical, but semantically different, such as the 3 in "300" and the 3 in "23". Table 3 compares the proposed position-dependent phonetic tokenization to two other common representations for three acoustically confusable entities "30$^{th}$", "38$^{th}$", and "13$^{th}$".

TABLE 3

| Ordinal | Word | Position Dependent Phonemes |
|---|---|---|
| 30$^{th}$ | thirtieth | $th_{10} er_{10} t_{10} iy_{10} ih_0 th_0$ |
| 38$^{th}$ | thirty eighth | $th_{10} er_{10} t_{10} iy_{10} ey_1 t_1 th_0$ |
| 13$^{th}$ | thirteenth | $th_{10} er_{10} t_{10} iy_{10} n_1 th_0$ |

It can be seen that the phonetic similarity of the three entities is captured in the present tokenization scheme, but is missing from the ordinal and word-based representations. It can also be seen that the sequence information is retained, as the leading "th" is represented differently than the trailing "th".

Prior to completing the discussion of tokenization component 302, a discussion of intersection search component (or classifier) 304 will now be undertaken for greater clarity.

Suffice it to say, for now, that search component 304 receives a tokenized query from tokenization component 302 corresponding to a street name. Search component 304 then searches intersection database 306 to obtain intersections which include that street name.

In the embodiment discussed herein, intersection search component 304 is a street name classifier embodied as a vector space model (VSM). In some other current systems, a VSM is used for information retrieval of text documents. In such text information retrieval systems, the VSM will be first discussed in this context in order to enhance understanding of its use in the present system. Each document $d_i$ in a collection D is represented as a vector $v_i$, whose components represent the importance of particular terms in the document. The most commonly used values for the components in these vectors are based on Term Frequency-Inverse Document Frequency (TF-IDF), as follows:

$$v_{ij} = TF_{ij} \cdot \log(IDF_i) = \frac{N_{ij}}{N_j} \cdot \log\left(\frac{M}{M_i}\right) \qquad \text{Eq. 1}$$

where $N_{ij}$ is the number of occurrences of a word $w_i$ in a document $d_j$, $N_j$ is the total number of words in $d_j$, M is the number of documents in the collection D and $M_i$ is the number of documents that contain $w_i$.

The TF-IDF score is composed of two terms, the term frequency (TF), which is the ratio of the number of occurrences of a word to the total number of words in the document, and inverse document frequency (IDF), which is the ratio of the total number of documents in a collection to the number of documents containing that word. Thus, for word $w_i$ in document $d_j$, TF-IDF is computed as:

$$S(d_i, d_j) = \cos\theta = \frac{v_i \cdot v_j}{\|v_i\|\|v_j\|} \qquad \text{Eq. 2}$$

If the two documents are identical, then S(di; dj)=1 and if the documents share no terms, then S(di; dj)=0. When a query q is made, it is treated as a document, and the appropriate vector $v_q$ is created. Documents similar to the query can then be identified.

When the VSM is used as intersection search component 304 in the present system 100 (shown in FIG. 4), streets can be thought of as documents, with words corresponding to the entities comprising a particular street's full name. For example, if the street names were used directly in the VSM, then "148$^{th}$ Ave NE" would be represented by a vector with non-zero TF-IDF scores for the term "148$^{th}$", "Ave", and "NE". Therefore, using a VSM for intersection search component 304 helps to locate street names when only a partial street name is spoken by the user.

Returning now to the discussion of tokenization component 302, assume that the user's utterance is recognized and parsed, and the semantic identities, along with the recognition hypotheses of the two hypothesized streets or street fragments are generated as 310 in FIG. 4. Next, tokenization component 302 tokenizes the semantic tag for the first street entity $s_1$. This tokenization is performed according to the tokenization scheme used to generate intersection database 306, as discussed above. Tokenization of the semantic tag for the first street entity $s_1$ generates a street query $q_1$ (303 in FIG. 4) corresponding to the first street in the hypothesis. The vector of TF-IDF scores is computed for query $q_1$ (as set out in Eq. 1 above) and intersection search component 304 then compares the similarity of $q_1$ to the first street of all intersections in database 306. This results in a ranked list of candidate intersections, based on the hypothesized first street $s_1$. The similarity is computed as set out in Eq. 2 above.

Tokenizing the semantic tag for street $s_1$ to create query $q_1$ is indicated by block 408 in FIG. 5, and executing the query to search for intersections with streets similar to $s_1$ in them is indicated by block 410 in FIG. 5. Generating the ranked list of results (candidate intersections) based on the first street is indicated by block 412 in FIG. 5.

Tokenization component 302 then tokenizes the semantic tag of the second street $s_2$ in the hypothesis, transforming it into a second query $q_2$. Intersection search component 304 is then used to calculate the TF-IDF vector scores for $q_2$ and compute the similarity between $s_2$ and all second streets in the previously generated list of candidate intersections (generated based on $s_1$). Performing the tokenization, generating the query, and generating the results based on the second query are indicated by blocks 414, and 408-412 in FIG. 6.

The overall score for each of the hypothesis intersections is then computed as the product of the VSM scores (generated by intersection search component 304) of the two streets in the intersection. Thus, the score for intersection I is calculated as follows:

$$I(s_1 = d_i, s_2 = d_j) = S(q_1, d_i) \cdot S(q_2, d_j) \qquad \text{Eq. 3}$$

where the similarities $S(q_1, d_i)$ and $S(q_2, d_j)$ are computed using Eq. 2 above. Calculating the overall score for each intersection in the results is indicated by block 416 in FIG. 6.

In one embodiment, in order to reduce redundancy in intersection database 306, all intersections are represented once with an arbitrary street ordering. If a user refers to an intersection with the opposite ordering, it will not match an entry in the database. As a result, the above procedure for intersection search can be performed both with the original ordering and with the queries $q_1$ and $q_2$ swapped. Thus, the final hypothesized intersection can be identified by computing the scores as follows:

$$I(s_1 = d_i, s_2 = d_j) = \\ \underset{i,j}{\mathrm{argmax}}\{S(q_1, d_i) \cdot S(q_2, d_j), S(q_2, d_i) \cdot S(q_1, d_j)\} \qquad \text{Eq. 4}$$

Figure 6:
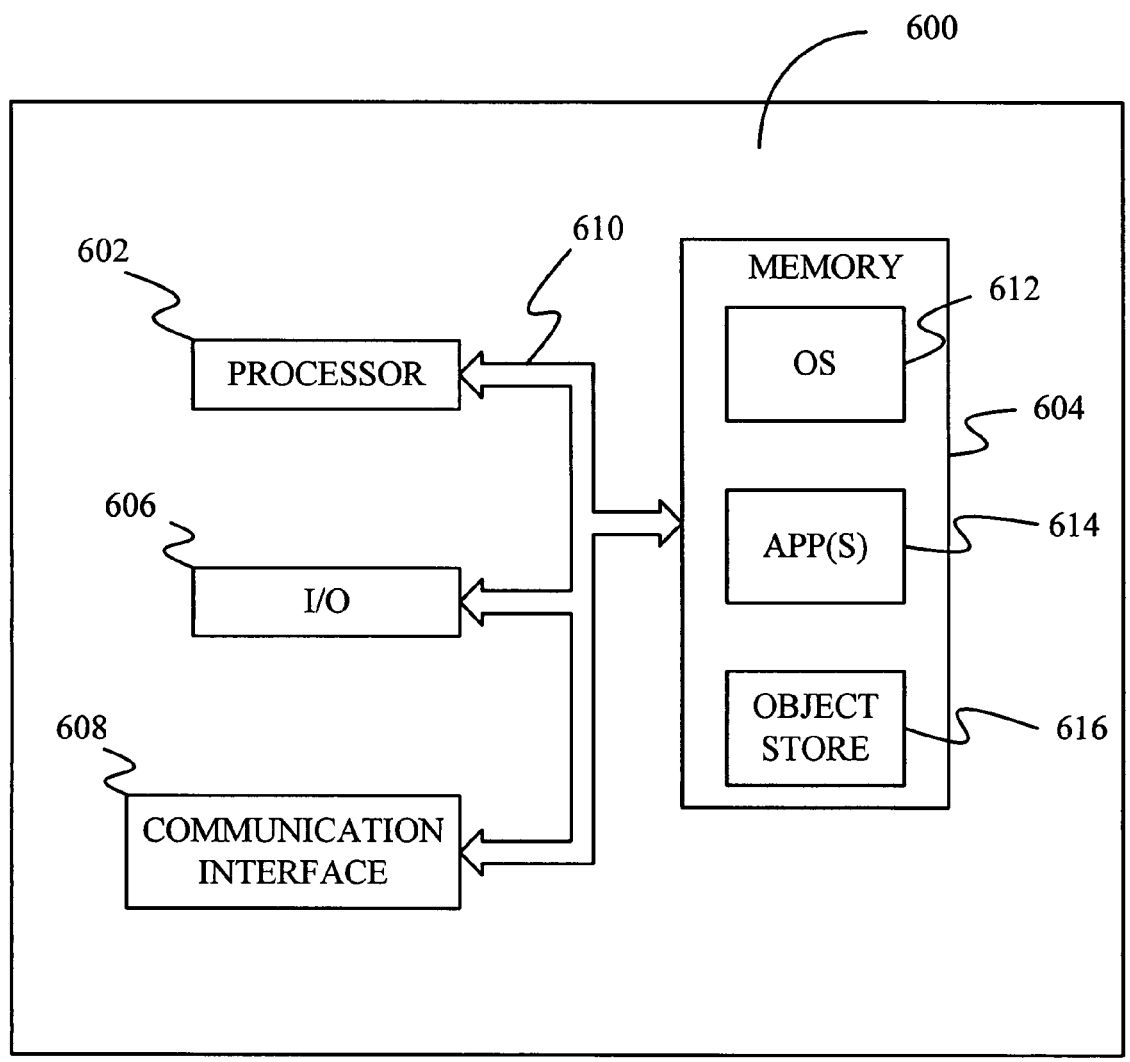
FIG. 6 is a block diagram of one illustrative computing environment.

The top scoring intersection, or a ranked list of candidate intersections, is then output as indicated by block 418 in FIG. 6, and the results themselves are indicated by block 320 in FIG. 4. Of course, as discussed above with respect to FIG. 1, the results can be returned to the user or output to another system (such as a navigation system, etc.) for further processing.

It has also been found that in densely populated areas, many users might believe themselves to be in one particular city when they are actually in a neighboring city. Therefore, in one embodiment, the intersections for all bordering cities are also searched in the intersection database 306. If an intersection is identified that is not in the city specified by the user, then a fixed penalty is applied to the VSM score generated by intersection search component 304, to reflect the fact that the intersection is outside the user's specified search area. The value of this penalty can be tuned using development data or it can be otherwise empirically set.

FIG. 6 shows one illustrative embodiment of an exemplary computing environment in which the present system can be used. FIG. 6 is a block diagram of a mobile device 600, which is an exemplary computing environment. Mobile device 200 includes a microprocessor 602, memory 604 (which can store system 100), input/output (I/O) components 606, and a communication interface 608 for communicating with remote computers or other mobile devices. In one embodiment, the afore-mentioned components are coupled for communication with one another over a suitable bus 610.

Memory 604 is implemented as non-volatile electronic memory such as random access memory (RAM) with a battery back-up module (not shown) such that information stored in memory 604 is not lost when the general power to mobile device 600 is shut down. A portion of memory 604 can be allocated as addressable memory for program execution, while another portion of memory 604 can be used for storage, such as to simulate storage on a disk drive.

Memory 604 includes an operating system 612, application programs 614 as well as an object store 616. During operation, operating system 612 is preferably executed by processor 602 from memory 604. Operating system 612 can illustratively be designed for mobile devices, and implements database features that can be utilized by applications 614 through a set of exposed application programming interfaces and methods. The location-based system (such as navigation systems, etc.) can be in application 614 for instance. The objects in object store 616 are maintained by applications 614 and operating system 612, at least partially in response to calls to the exposed application programming interfaces and methods.

Communication interface 608 represents numerous devices and technologies that allow mobile device 600 to send and receive information. The devices include wired and wireless modems, satellite receivers and broadcast tuners to name a few. In one embodiment, mobile device 600 can also be directly connected to a computer to exchange data therewith. In such cases, communication interface 608 can be an infrared transceiver or a serial or parallel communication connection, all of which are capable of transmitting streaming information.

Input/output components 606 can include a variety of input devices such as a touch-sensitive screen, buttons, rollers, and a microphone as well as a variety of output devices including an audio generator, a vibrating device, and a display. The devices listed above are by way of example and need not all be present on mobile device 600. In addition, other input/output devices may be attached to or found with mobile device 600.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for recognizing location information input by a user, the location information including an intersection of streets, the system comprising:
   a grammar having a street grammar component that maps various different pronunciations of street names to semantic tags;
   a recognition system configured to receive the location information input, access the grammar, and generate a street name recognition hypothesis with associated semantic tags;
   an intersection data store storing a plurality of valid street intersections, each street intersection having street names of intersecting streets;
   a tokenization component configured to receive the street name recognition hypothesis and the associated semantic tags and to generate, for each of the associated semantic tags, a tokenized query having phonemes that are labeled with a digits position;
   a search component configured to search the intersection data store based on the tokenized queries and output at least one recognized intersection result identifying a street intersection recognized from the location information input by the user; and
   wherein the phonemes are labeled with a "100" for a 100's place, with a "10" for a 10's place, with a "1" for a 1's place, and with a "0" for an ordinal suffix.

2. The system of claim 1 wherein the semantic tags each represent a portion of a given street name, and wherein each tokenized query representing a plurality of different pronunciations associated with the given semantic tag.

3. The system of claim 1 wherein the tokenization component is configured to label each phoneme with a digits position.

4. The system of claim 1 wherein at least one of the tokenized queries includes multiple occurrences of a same phoneme and each of the multiple occurrences is labeled with a different digits position.

5. The system of claim 1 wherein at least one of the tokenized queries includes two different phonemes and each of the two different phonemes is labeled with a same digits position.

6. The system of claim 1 wherein the intersection data store stores a pronunciation for each of the street names in the street intersections tokenized in tokens representative of a set of sub-word units defining words in the street names.

7. The system of claim 6 wherein the tokens further define a position dependence of each sub-word unit that define at least some of the words in the street names.

8. The system of claim 7 wherein the position dependence is provided for each sub-word unit that defines a portion of a numeric word, the position dependence indicating a digits place defined by the sub-word unit in the numeric word.

9. The system of claim 1 wherein the search component is configured to return top N recognized search results based on search scores computed for each search result.

10. The system of claim 1 wherein the search component comprises:
    a model configured to calculate a vector of scores corresponding to the query and determine a similarity of the query to the street names in the valid intersections in the intersection data store based on the vector of scores for the query and a vector of scores for each of the street names.

11. The system of claim 1 wherein the street name recognition hypothesis includes semantic tags for a plurality of street names and wherein the tokenization component is configured to generate a query for each semantic tag.

12. The system of claim 11 wherein the search component is configured to compute similarity scores for each query based on a similarity of the query to street names in the intersection data store and to calculate an intersection score by combining the similarity scores for each query relative to street names that occur in a valid intersection in the intersection data store.

13. The system of claim 1 wherein the grammar includes an intersection grammar component defining a plurality of different ways to specify an intersection, having slots for street names, the street grammar component being configured to fill the slots in the intersection grammar component with street names.

14. The system of claim 13 wherein the grammar is configured to have a particular street grammar component loaded into the intersection grammar component based on a city identity input by the user.

15. The system of claim 14 wherein the recognition system is configured to load a plurality of street grammar components for cities in a given geographic proximity to one another based on the city identity input by the user.

16. The system of claim 15 wherein the search component calculates a score for the recognized intersection result based on whether the street intersection recognized is in a city identified in the city identity input by the user or in another city for which a street grammar component is loaded.

17. The system of claim 1 wherein the location information input by the user comprises a spoken input and wherein the recognition system comprises an automatic speech recognition system.

18. A method of generating a street names grammar for use in an intersection recognition system, the method comprising:

receiving an intersection with street names;

parsing each street name into a sequence of entities representing individual components of the street name;

utilizing a processor of a computing device to construct a graph based on the entities, the graph having a plurality of paths representing a plurality of possible pronunciations of the street name, each path through the graph representing a different pronunciation;

generating an utterance representation for each of the plurality of possible pronunciations;

mapping each utterance representation corresponding to a given pronunciation to a common semantic tag;

assigning a prior probability score to each pronunciation;

outputting the plurality of possible pronunciations, utterance representations, semantic tags and prior probabilities as the street names grammar for use in a street names understanding system; and generating additional utterance representations for each path through the graph, the additional utterance representations including alternative pronunciations and prefix substitutions for the given path.

* * * * *

UNITED STATES PATENT AND TRADEMARK OFFICE
CERTIFICATE OF CORRECTION

| | | |
|---|---|---|
| PATENT NO. | : 7,983,913 B2 | Page 1 of 1 |
| APPLICATION NO. | : 11/888275 | |
| DATED | : July 19, 2011 | |
| INVENTOR(S) | : Michael L. Seltzer et al. | |

It is certified that error appears in the above-identified patent and that said Letters Patent is hereby corrected as shown below:

In column 10, line 17, in Claim 2, delete "representing" and insert -- represents --, therefor.

Signed and Sealed this
Twenty-third Day of August, 2011

David J. Kappos
*Director of the United States Patent and Trademark Office*